US010967815B2

(12) United States Patent
Okii et al.

(10) Patent No.: US 10,967,815 B2
(45) Date of Patent: Apr. 6, 2021

(54) HARNESS MOUNTING STRUCTURE (71) Applicant: Mazda Motor Corporation, Hiroshima (JP)

(72) Inventors: Noriyoshi Okii, Hiroshima (JP); Kunihiro Nishi, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 95 days.

(21) Appl. No.: 16/341,187

(22) PCT Filed: Oct. 12, 2017

(86) PCT No.: PCT/JP2017/036923
§ 371 (c)(1),
(2) Date: Apr. 11, 2019

(87) PCT Pub. No.: WO2018/070458
PCT Pub. Date: Apr. 19, 2018

(65) Prior Publication Data
US 2020/0189380 A1 Jun. 18, 2020

(30) Foreign Application Priority Data
Oct. 14, 2016 (JP) .............................. JP2016-202479

(51) Int. Cl.
*B60R 16/02* (2006.01)
*B60K 5/04* (2006.01)
(Continued)

(52) U.S. Cl.
CPC ............ *B60R 16/0215* (2013.01); *B60K 5/04* (2013.01); *B60K 17/22* (2013.01); *B60K 17/06* (2013.01)

(58) Field of Classification Search
CPC . B60R 16/02; B60R 16/0207; B60R 16/0215; B60K 5/04; B60K 17/06; B60K 17/22; B60K 17/24; F02B 77/00
See application file for complete search history.

(56) References Cited

U.S. PATENT DOCUMENTS 5,060,625 A * 10/1991 Bruning .............. B60R 16/0215
123/143 C
5,305,848 A * 4/1994 Akutagawa .............. B60K 5/04
180/292
(Continued)

FOREIGN PATENT DOCUMENTS

DE 3725459 A1 2/1989
EP 1318050 A1 6/2003
(Continued)

OTHER PUBLICATIONS

European Patent Office, Extended European Search Report Issued in Application No. 17860267.8, dated Sep. 9, 2019, Germany, 5 pages.

*Primary Examiner* — Laura Freedman
(74) *Attorney, Agent, or Firm* — Alleman Hall Creasman & Tuttle LLP (57) ABSTRACT

A harness has a laterally extending portion disposed along a block rear surface of an engine and extending in a width direction of a vehicle within a predetermined height range in which a drive shaft is included. The engine has a projection disposed in at least one of a position above the laterally extending portion or a position below the laterally extending portion within the predetermined height range in a portion, of the engine, toward the rear of the vehicle, the projection projecting, toward the rear of the vehicle, further than the laterally extending portion.

8 Claims, 6 Drawing Sheets

(51) Int. Cl.
*B60K 17/22* (2006.01)
*B60K 17/06* (2006.01)

(56) References Cited

U.S. PATENT DOCUMENTS

| | | | |
|---|---|---|---|
| 5,813,381 A * | 9/1998 | Kakimoto | B60R 16/0215 |
| | | | 123/195 A |
| 8,365,858 B2 * | 2/2013 | Tamagawa | B60R 16/0207 |
| | | | 180/291 |
| 8,936,303 B2 * | 1/2015 | Awakawa | B60R 16/0215 |
| | | | 296/208 |
| 9,321,413 B2 * | 4/2016 | Maemoto | H01M 2/1083 |
| 9,322,722 B2 * | 4/2016 | Nishi | G01K 13/00 |
| 9,772,034 B2 * | 9/2017 | Chiba | F01M 11/0004 |
| 2010/0064787 A1 | 3/2010 | Aoki et al. | |
| 2016/0121822 A1 * | 5/2016 | Shaw | B60R 16/0215 |
| | | | 248/74.3 |

FOREIGN PATENT DOCUMENTS

| | | | | |
|---|---|---|---|---|
| EP | 1482149 A1 | | 12/2004 | |
| GB | 2402490 A | | 12/2004 | |
| JP | 02207169 A | * | 8/1990 | |
| JP | H11099917 A | | 4/1999 | |
| JP | 2004353508 A | | 12/2004 | |
| JP | 2008163841 A | | 7/2008 | |
| JP | 2009255858 A | | 11/2009 | |
| JP | 2010071146 A | | 4/2010 | |
| JP | 2012116236 A | * | 6/2012 | |
| JP | 2012117384 A | * | 6/2012 | |
| JP | 2014076744 A | * | 5/2014 | |
| JP | 2014076745 A | * | 5/2014 | |
| JP | 2015068218 A | * | 4/2015 | |
| JP | 2015068278 A | | 4/2015 | |
| JP | 2018053722 A | * | 4/2018 | |
| JP | 2018053741 A | * | 4/2018 | |
| JP | 2019039343 A | * | 3/2019 | ............ F02B 77/11 |

* cited by examiner

FIG. 6

HARNESS MOUNTING STRUCTURE

TECHNICAL FIELD

The technique disclosed in this specification relates to a harness mounting structure for a wiring harness.

BACKGROUND ART

A conventionally known vehicle provided with an engine and a drive shaft extending in a vehicle width direction such that the drive shaft is disposed in a portion, of the engine, toward the rear of the vehicle and passes a position where the drive shaft overlaps with the engine when viewed from the rear of the vehicle has a harness mounting structure in which a part of wiring harnesses provided in the vehicle is disposed along at least a surface, of the engine, toward the rear of the vehicle.

For example, Patent Document 1 shows a configuration in which an oil level sensor is provided at a bottom of an oil pan provided at a lower end of an engine, a wiring harness is disposed so as to extend from the oil level sensor along a surface, of the oil pan, toward the rear of the vehicle, and the harness is covered with a protective member.

CITATION LIST

Patent Document

Patent Document 1: Japanese Unexamined Patent Publication No. 2008-163841

SUMMARY OF THE INVENTION

Technical Problem

When the harness is disposed along a surface, of the engine, toward the rear of the vehicle, a portion of the harness comes close to the drive shaft.

Under a severely cold environment, snow or the like may adhere to the drive shaft during the running of the vehicle, and during parking of the vehicle, icicle-shaped ice may be formed on the outer peripheral surface of the drive shaft due to the snow or the like.

When the vehicle is started in a state in which icicle-shaped ice is formed on the outer peripheral surface of the drive shaft, the ice is rotated integrally with the drive shaft, and is brought into contact with a part of the harness. This may cause damage to the harness.

In the configuration of Patent Document 1, a harness disposed along a surface, of the engine, toward the rear of the vehicle is covered with a protective member, thereby substantially preventing damage to the harness due to the ice.

However, since the harness is disposed in such a way as to avoid parts disposed around the harness, the layout of the harness may be complicated. When the layout of the harness becomes complicated, the shape of the protective member needs to be complicated in accordance with the layout of the harness. Therefore, it is difficult to manufacture the protective member itself, and the cost for manufacturing the protective member becomes high.

The technique disclosed in this specification is conceived in view of the above problems, and attempts to provide a technique of protecting a harness from ice formed on an outer peripheral surface of a drive shaft without providing a protective member for protecting the harness.

Solution to the Problem

In order to solve the above problems, the technique disclosed in this specification is directed to a harness mounting structure which is provided with an engine mounted in an engine compartment of a vehicle, a drive shaft extending in a vehicle width direction such that the drive shaft is disposed in a portion, of the engine, toward the rear of the vehicle in the engine compartment and passes a position where the drive shaft overlaps with the engine when viewed from the rear of the vehicle, and a harness disposed along at least a surface, of the engine, toward the rear of the vehicle, the harness mounting structure comprising: a laterally extending portion provided to the harness and disposed along the surface, of the engine, toward the rear of the vehicle, and extending in the vehicle width direction within a predetermined height range in which the drive shaft is included; and a projection disposed in at least one of a position above the laterally extending portion or a position below the laterally extending portion within the predetermined height range in a portion, of the engine, toward the rear of the vehicle, and projecting, toward the rear of the vehicle, further than the laterally extending portion.

According to this configuration, since the laterally extending portion of the harness and the projection projecting, toward the rear of the vehicle, further than the laterally extending portion within the predetermined height range the drive shaft is included. Thus, even if ice, particularly, icicle-shaped ice is formed on the outer peripheral surface of the drive shaft during parking of the vehicle, the ice can be brought into contact with the projection and broken so as not to come into contact with the laterally extending portion of the harness. Specifically, in a situation where the projection is provided above the laterally extending portion, if the vehicle is to be started forward, the vehicle may be moved forward as it is, and if the vehicle is to be started backward, the vehicle may be once moved forward and then, may be moved backward. Because of such operations, the ice can be broken by the projection so as not to come into contact with the harness, and then, the vehicle can be started forward and backward. On the other hand, in a situation where the projection is provided below the laterally extending portion, if the vehicle is to be started forward, the vehicle may be once retreated, and then, may be moved forward, and if the vehicle is to be started backward, the vehicle may be moved backward as it is. Because of such operations, the ice is broken by the projection so as not to come into contact with the harness, and then, the vehicle can be started forward and backward. As a result, it is possible to protect the harness from the ice formed on the outer peripheral surface of the drive shaft without providing a protective member for protecting the harness.

In the harness mounting structure, it is preferable that when viewed from the rear of the vehicle, the laterally extending portion is disposed so as to substantially entirely overlap with the drive shaft.

According to this configuration, it is possible to downsize the harness mounting structure around the drive shaft.

In one embodiment of the harness attachment structure, the engine is a transverse engine, a transmission is disposed adjacent to one end of the engine in the vehicle width direction, in the vehicle width direction, the drive shaft has a first portion and a second portion in the vehicle width direction in this order from the transmission toward the engine, the second portion having a larger diameter than the first portion, in the vehicle width direction, the harness has an upwardly extending portion disposed closer to the transmission than the laterally extending portion, and extending upwardly from a position below the laterally extending portion along the surface, of the engine, toward the rear of the vehicle, and in the vehicle width direction, the upwardly extending portion is disposed closer to the transmission than the second portion is.

In other words, if one end of the harness is positioned below the laterally extending portion, the harness has an upwardly extending portion extending upward from a position below the laterally extending portion, so that the upwardly extending portion needs to be protected from the ice formed on the outer peripheral surface of the drive shaft. Therefore, the upwardly extending portion is disposed closer to the transmission than the second portion is in the vehicle width direction. Thus, the portion, of the upwardly extending portion, adjacent to the drive shaft overlaps with the first portion having a relatively small diameter when viewed from the rear of the vehicle. As a result, since the distance between the outer peripheral surface of the drive shaft and the upwardly extending portion is sufficiently secured, it is possible to prevent the upwardly extending portion from being damaged by the ice.

In the harness mounting structure in which the harness has an upwardly extending portion, a drive shaft support rotatably supporting the drive shaft is disposed in a portion, of the first portion, adjacent to a connection portion between the first portion and the second portion, the drive shaft support is mounted on the surface, of the engine, toward the rear of the vehicle, and a space through which the upwardly extending portion passes is formed between the drive shaft support and the surface, of the engine, toward the rear of the vehicle.

According to this configuration, the upwardly extending portion passes through the space formed in the drive shaft support near the drive shaft, and therefore, a portion, of the upwardly extending portion, adjacent to the drive shaft is protected by the drive shaft support. As a result, it is possible to further protect the harness from the ice formed on the outer peripheral surface of the drive shaft.

In the harness mounting structure, it is preferable that the projection includes an upper projection provided above the laterally extending portion and a lower projection provided below the laterally extending portion within the predetermined height range, a harness clip is provided between the upper projection and the lower projection, and fixes the laterally extending portion to a portion, of the engine, toward the rear of the vehicle, and the harness clip is disposed in a portion, of a gap between the upper projection and the lower projection, adjacent to one of the upper projection or the lower projection.

According to this configuration, the upper projection is formed above the laterally extending portion, whereas the lower projection is formed below the laterally extending portion. Therefore, in both cases of forward starting and backward starting of the vehicle, if the vehicle is started as it is, the ice formed on the outer peripheral surface of the drive shaft can be destroyed.

In addition, in the portion where the harness clip is provided, the harness clip has a role like a protective member, so that it is possible to further substantially prevent the harness from being damaged.

In the harness mounting structure in which the harness clip is provided between the upper projection and the lower projection, it is preferable that an attachment portion is provided adjacent to the upper projection or the lower projection in a portion, of the engine, toward the rear of the vehicle, and fixes the harness clip to the portion, of the engine, toward the rear of the vehicle, the harness clip has an insertion portion inserted into an insertion hole formed in the attachment portion, and the insertion portion is inserted into the insertion hole toward the projection closer to the attachment portion.

For example, if the harness clip is disposed adjacent to the upper projection, the harness clip is inserted into the insertion hole of the attachment portion toward the upper projection. Here, it is assumed that ice is formed on a portion, of the outer peripheral surface of the drive shaft, adjacent to the engine within a height range between the harness clip and the lower projection. In this case, when the vehicle is moved backward, the drive shaft rotates in a direction in which the ice approaches the harness clip, but even if the ice is brought into contact with the harness clip, the harness (laterally extending portion) is protected by the harness clip. Further, since a load is applied to the harness clip in a direction in which the harness clip is inserted into the attachment portion, the harness clip does not come off from the attachment portion of the harness clip. Further, even if ice is formed in a portion of the outer peripheral surface of the drive shaft within a height range between the harness clip and the upper projection, the upper projection prevents the ice from growing to the extent that the ice reaches the harness, so that the ice formed in the portion does not damage the harness.

Also, if the harness clip is positioned adjacent to the lower projection, the harness clip is inserted into the insertion hole of the attachment portion toward the lower projection. Here, it is assumed that ice is formed on the portion, of the outer peripheral surface of the drive shaft, adjacent to the engine, within the height range between the harness clip and the upper projection. In this case, when the vehicle moves forward, the drive shaft rotates in a direction in which the ice approaches the harness clip, but even if the ice comes into contact with the harness clip, the harness is protected by the harness clip. Further, since a load is applied to the harness clip in a direction in which the harness clip is inserted into the attachment portion, the harness clip does not come off from the attachment portion of the harness clip. Further, even if ice is formed in a portion of the outer peripheral surface of the drive shaft in within the height range between the harness clip and the lower projection, the lower projection prevents the ice from growing to the extent that the ice reaches the harness, and thus the ice formed in the portion does not damage the harness.

In the harness mounting structure, it is preferable that the engine includes an exhaust passage having a specific passage extending along the surface, of the engine, toward the rear of the vehicle, a lower end of the specific passage of the exhaust passage is positioned above the laterally extending portion, and the projection is provided in at least a position below the lower end of the specific passage of the exhaust passage and above the laterally extending portion.

In other words, it is desirable to protect the harness not only from the ice formed on the outer peripheral surface of the drive shaft but also from the radiant heat from the exhaust passage. If the projection is provided in a position below the lower end of a specific portion of the exhaust passage and above the laterally extending portion, the projection functions as a heat insulating portion that blocks the radiant heat from the exhaust passage toward the harness. Thus, it is possible to protect the harness not only from the ice but also from the heat radiated from the exhaust passage.

In the harness attachment structure, it is preferable that a length of the projection in a vehicle longitudinal direction is set such that, in a situation where a circle circumscribing a portion, of the laterally extending portion of the harness, toward the rear of the vehicle is drawn around an axial center of the driving shaft as a center when viewed from an axial direction of the drive shaft, an end, of the projection, toward the rear of the vehicle is positioned inside the circle.

According to this configuration, it is possible to more reliably prevent the ice from coming into contact with the laterally extending portion of the harness.

Advantages of the Invention

As described above, according to the technology disclosed herein, the engine is provided with the projection projecting, toward the rear of the vehicle, further than the laterally extending portion, and disposed in at least one of a position above the laterally extending portion of the harness or a position below the laterally extending portion of the harness within the predetermined height range in which the drive shaft is included. Therefore, even if ice, in particular, icicle-shaped ice is formed on the outer peripheral surface of the drive shaft during parking of the vehicle, the ice can be brought into contact with the projection and can be broken when the vehicle is to be started forward or backward from a parked state. The vehicle can be started with the ice not coming into contact with the harness. Thus, it is possible to protect the harness from the ice formed on the outer peripheral surface of the drive shaft without providing a protective member for protecting the harness.

DESCRIPTION OF EMBODIMENTS

An exemplary embodiment will now be described with reference to the drawings.

Figure 1:
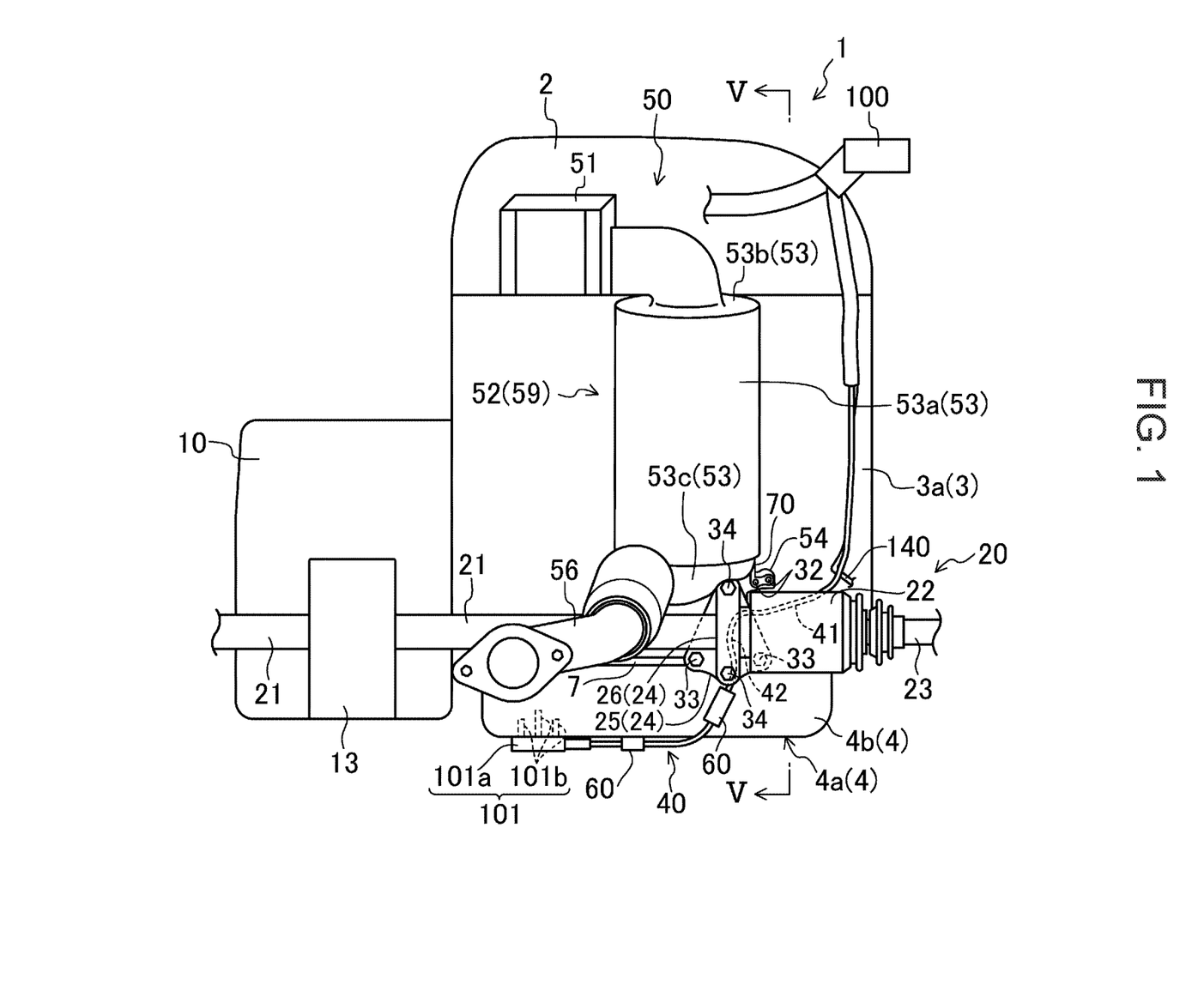
FIG. 1 is a view of an engine to which a harness mounting structure is applied when viewed from the rear of a vehicle.

FIG. 1 shows an engine 1 to which a harness mounting structure according to an embodiment is applied. This engine 1 is laterally disposed in an engine compartment such as an automobile so that the cylinder bank direction coincides with the vehicle width direction (the lateral direction in FIG. 1). That is to say, the engine 1 is a transverse engine.

The engine 1 is comprised of a cylinder head 2, a cylinder block 3, and an oil pan 4 which are arranged vertically in this order and coupled together. In the following description, a side adjacent to the cylinder head 2 will be referred to as "upper side," and a side adjacent to the oil pan 4 will be referred to as "lower side."

A plurality of cylinders (not illustrated) are arranged in series in an upper portion of the cylinder block 3 so as to form a cylinder row. A crankshaft 6 (see FIG. 5) extending in the vehicle width direction is disposed in a lower portion of the cylinder block 3.

The cylinder head 2 is provided with, for each cylinder, an intake port (not illustrated) for introducing fresh air into a combustion chamber in each cylinder, and an exhaust port (not illustrated) for discharging exhaust gas from the combustion chamber. The cylinder head 2 is also provided with an inlet (not illustrated) and an outlet (not illustrated) for allowing the intake and exhaust ports to face the combustion chamber.

Figure 2:
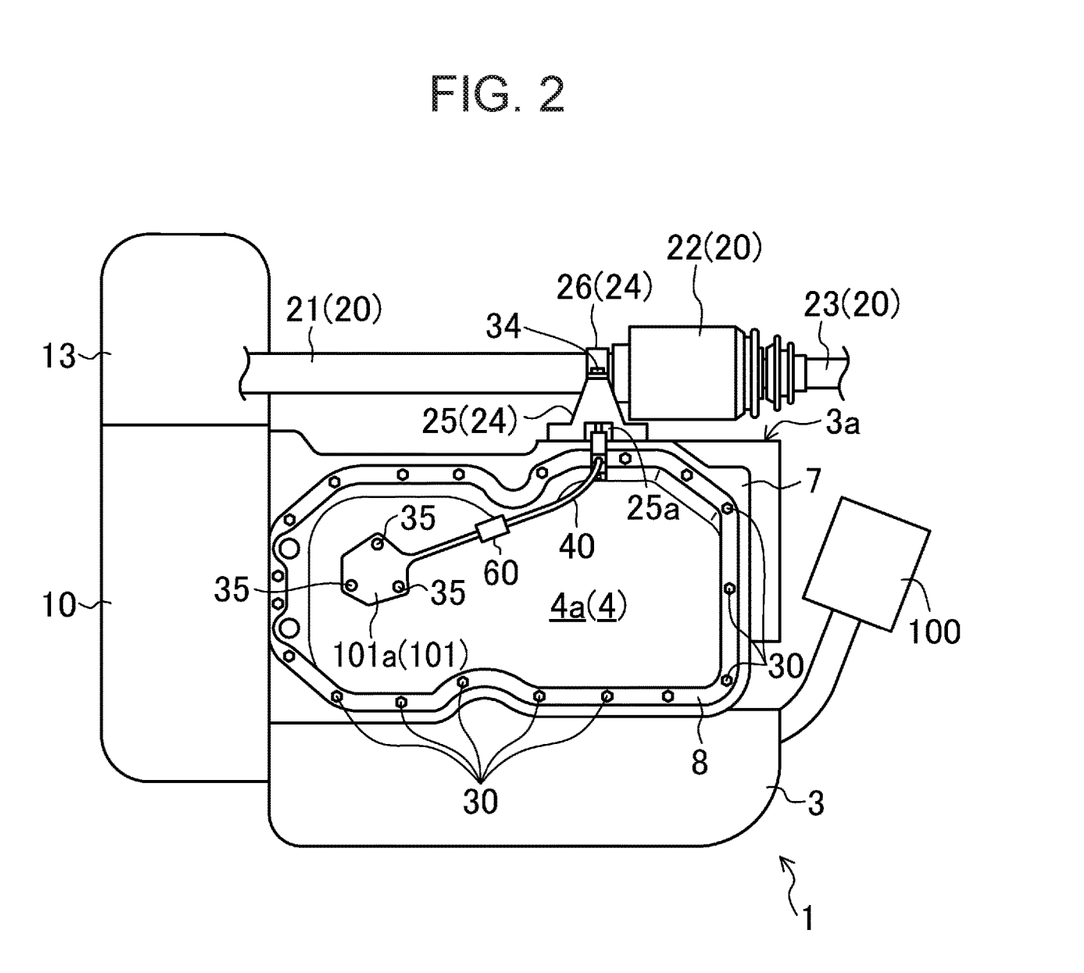
FIG. 2 is a view of the engine when viewed from below.

As illustrated in FIG. 2, the oil pan 4 is connected to a lower end of the cylinder block 3 using a plurality of bolts 30. A block-side mounting flange 7 is circumferentially formed on the entire lower end of the cylinder block 3, and an oil-pan-side mounting flange 8 is circumferentially formed on the entire upper end of the oil pan 4. In the oil pan 4, the oil pan 4 is connected to the lower end of the cylinder block 3 by fastening the plurality of bolts 30 with the mounting flanges 7 and 8 in contact with each other such that the block-side mounting flange 7 is located above the oil-pan-side mounting flange 8.

The oil pan 4 stores oil which is supplied to, e.g., a bearing metal (not illustrated) of the crankshaft 6. Although not illustrated, an oil pump is disposed in the lower portion of the cylinder block 3 to supply oil to each component of the engine 1. An oil level sensor 101 for detecting a residual amount of oil in the oil pan 4 is disposed on the bottom of the oil pan 4 (hereinafter, referred to as an oil pan bottom 4a).

As illustrated in FIG. 1, an exhaust passage 50 for discharging exhaust gas discharged from each of the cylinders of the engine 1 to the outside of the vehicle is disposed in a portion, of the engine 1, toward the rear of the vehicle. The exhaust passage 50 includes an exhaust manifold (not illustrated), a turbocharger 51, a direct catalyst 52, and a downstream exhaust pipe 56 arranged in this order from the upstream side of the flow of the exhaust gas.

The exhaust manifold is an opening that opens on the surface, of the engine 1, toward the rear of the vehicle, and is connected to an opening of the exhaust port of the cylinder head 2 away from the combustion chamber. Although not illustrated in the figure, the exhaust manifold has a plurality of exhaust branch pipes respectively corresponding to the plurality of cylinders of the engine 1, and is formed so that the plurality of exhaust branch pipes converge into one concentrate pipe in the downstream side of the flow of the exhaust gas. The turbocharger 51 and the direct catalyst 52 are connected in this order from the upstream side of the flow of the exhaust gas to the concentrate pipe of the exhaust manifold. The turbocharger 51 is provided with a turbine rotated and driven by exhaust gas to rotate and drive a compressor provided in an intake passage. The direct catalyst 52 serves as an exhaust gas purifier for purifying exhaust gas. Each of the exhaust branch pipes corresponding to the plurality of cylinders is connected to the opening of the exhaust port away from the combustion chamber, thereby communicating with each of the cylinders.

As illustrated in FIG. 1, the direct catalyst 52 is disposed in a portion, of the engine 1, toward the rear of the vehicle so that a gas flow path in the case 53 substantially extends in the vertical direction. A bracket 70 is attached using a bolt 31 (see FIG. 5) to the lower end of one side of the direct catalyst 52 (case 53) in the vehicle width direction (the side away from the transmission 10, which will be described later). The bracket 70 is fixed to a fixing member 54 using a bolt 32. A portion, of the direct catalyst 52, extending along the block rear surface 3a constitutes a specific passage 59 of the exhaust passage 50.

The direct catalyst 52 is formed by disposing an exhaust purification catalyst in a gas passage in a substantially cylindrical case 53. The case 53 has a tubular (in this embodiment, cylindrical) catalyst arrangement portion 53a in which the exhaust purification catalyst is disposed, and an upstream member 53b and a downstream member 53c that cover the openings on the upstream and downstream sides of the flow of the exhaust gas in the catalyst arrangement portion 53a. The exhaust purification catalyst is a three-way catalyst, and is particularly intended to purify HC and CO when the engine 1 is in a cold state.

The downstream exhaust pipe 56 is connected to the downstream member 53c of the case 53 in the direct catalyst 52. The downstream exhaust pipe 56 is disposed so as to extend from a portion connected to the direct catalyst 52 (an upstream end of the downstream exhaust pipe 56) toward a tunnel opening formed at a center portion of a lower end of a dash panel (not illustrated) in the vehicle width direction. The downstream exhaust pipe 56 is comprised of a plurality of separate pipes disposed in the longitudinal direction thereof. In FIG. 1, only the divided pipe in the most upstream portion located in the engine compartment is shown, and the description of the other divided pipes is omitted.

A transmission 10 is coupled to one side of the engine 1 in the vehicle width direction (in this embodiment, the left side of the vehicle (the left side of FIG. 1)). The engine 1 and the transmission 10 constitute a power plant. This transmission 10 is an automatic transmission, and has a transmission case in which a transmission mechanism is provided. The transmission 10 is laterally disposed in which input and output shafts, which are not illustrated, extend in the vehicle width direction. The input shaft is coupled to the crankshaft 6 of the engine 1, and the output shaft is coupled to a differential gear 13 disposed in a side, of the transmission 10, toward the rear of the vehicle.

From the differential gear 13, a drive shaft 20 for driving the right and left wheels of the vehicle extends along both sides of the vehicle in the vehicle width direction.

A portion, of the drive shaft 20, extending from the differential gear 13 toward the right wheel has, in the vehicle width direction (i.e., a direction from the differential gear 13 toward the engine 1), a first shaft (a first portion) 21, a ball joint 22 (a second portion) having a larger diameter than the first shaft 21, and a second shaft 23 connected to the first shaft 21 through the ball joint 22. The second shaft 23 is connected to the right wheel. The portion, of the first shaft 21, connected to the ball joint 22 has a diameter larger than the other portions of the first shaft 21 and smaller than the ball joint 22.

The drive shaft 20 is rotatably supported by the engine 1 via a drive shaft support 24 in a portion, of the first shaft 21, adjacent to a connection portion between the first shaft 21 and the ball joint 22. The drive shaft support 24 includes first and second supports 25 and 26. The first support 25 is fixed to a lower surface, of the cylinder block 3 of the engine 1, toward the rear of the vehicle (hereinafter, referred to as a "block rear surface 3a") using a bolt 33. The second support 26 is fixed to a portion, of the first support 25, toward the rear of the vehicle using a bolt 34.

Figure 3:
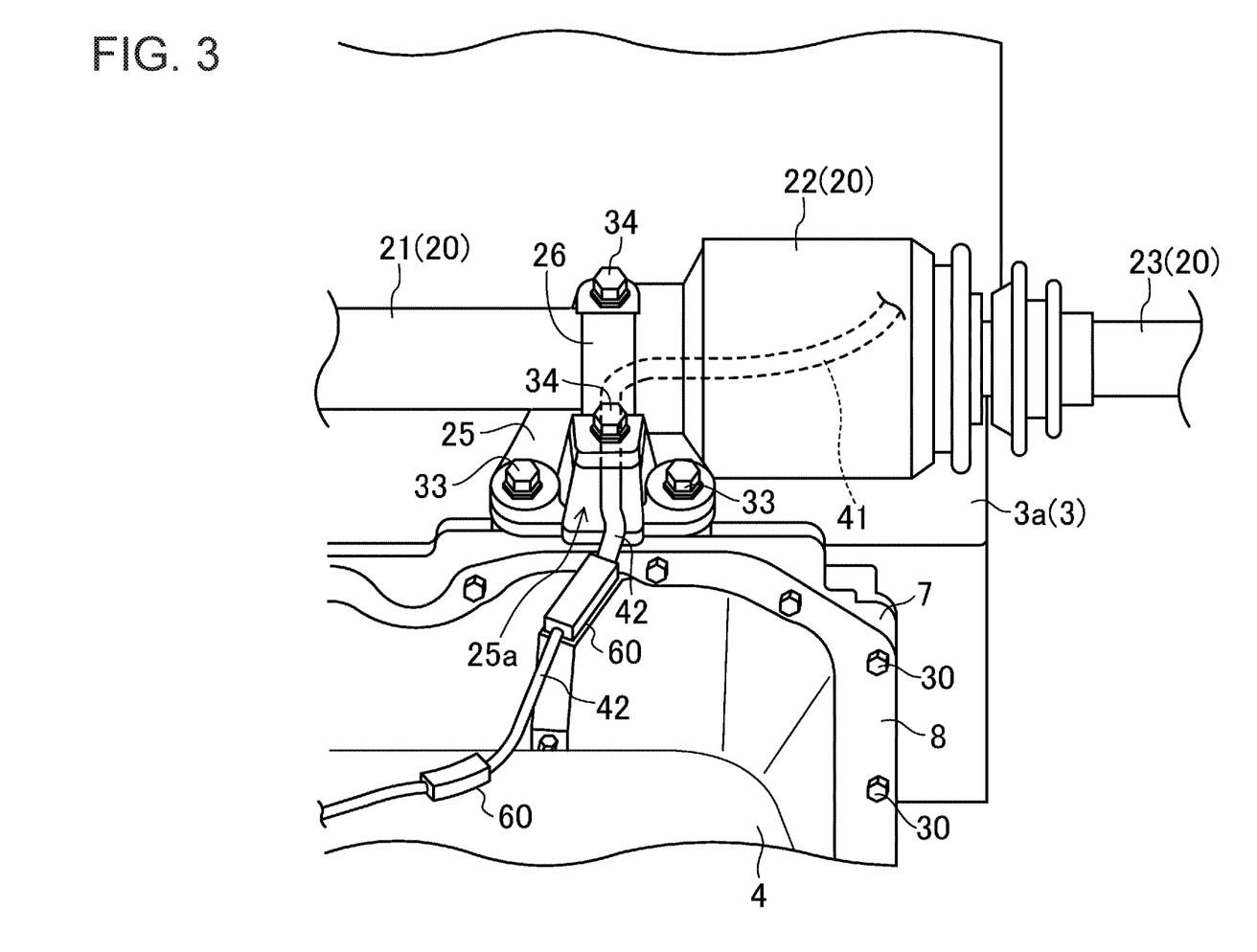
FIG. 3 is a perspective view of a drive shaft support and its surroundings when viewed from the rear of the vehicle and from below.
Figure 4:
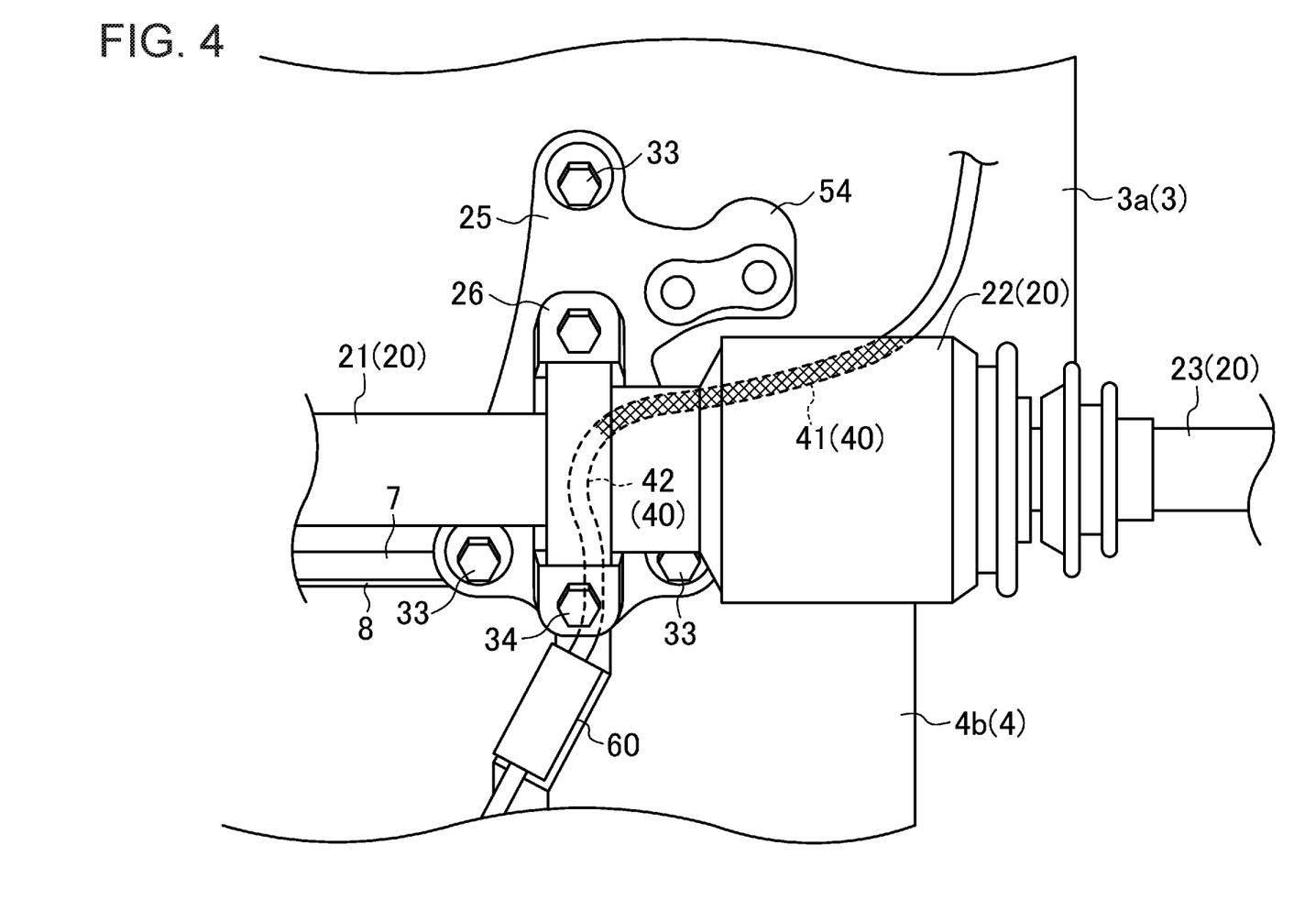
FIG. 4 is a view of the drive shaft support and its surroundings when viewed from the rear of the vehicle.

As illustrated in FIGS. 1, 3, and 4, the first support 25 has a substantially triangular shape such that the width thereof decreases in the vehicle width direction toward the upper side when viewed from the rear of the vehicle. A portion corresponding to each apex of the triangular shape is attached and fixed to a lower portion of the cylinder block 3 using the bolt 33. (In FIG. 1, the upper end of the first support 25 is not seen since it overlaps with the direct catalyst 52. In FIG. 3, the upper end of the first support 25 is not seen since it overlaps with the first shaft 21). In a surface, of the first support 25, toward the rear of the vehicle, the center portion in the vertical direction is recessed to have a semicircular shape from the rear of the vehicle toward the engine 1 when viewed from the axial direction of the drive shaft 20 so as to be adapted to the outer peripheral shape of the first shaft 21 of the drive shaft 20. Further, the first support 25 is integrally formed with the fixing member 54 at an upper end thereof (see FIG. 4).

The second support 26 is formed by bending a plate member in a semicircular shape to have a curve so as to conform to an outer peripheral shape of the first shaft 21 of the drive shaft 20, and is disposed so that the curve is positioned on a portion, of the first shaft 21, toward the rear of the vehicle. The second support 26 is fixed to the first support 25 by attaching the upper and lower ends thereof to the first support 25 via the bolt 34.

As illustrated in FIGS. 3 and 4, the first shaft 21 is sandwiched between the first support 25 and the second support 26, and is supported by the drive shaft support 24. Further, a sliding member (not illustrated) is disposed on a portion, of the first support 25, toward the rear of the vehicle, and a sliding member (not illustrated) is disposed on a portion, of the second support 26, adjacent to the drive shaft 20. When the first shaft 21 is disposed between the first and second supports 25 and 26, each of the slide members is brought into contact with an outer peripheral surface of the first shaft 21. As will be described in detail later, a space 25a (see FIG. 3) through which a harness 40 extending from the oil level sensor 101 passes is formed between the first support 25 and the block rear surface 3a.

The drive shaft 20 is supported by the engine 1 via the drive shaft support 24. Thus, as illustrated in FIG. 1, the drive shaft 20 passes a position where the drive shaft 20 overlaps with the engine 1 when viewed from the rear of the vehicle to extend in the vehicle width direction.

As illustrated in FIGS. 1 and 2, the oil level sensor 101 is attached to the oil pan bottom 4a. The oil level sensor 101 is an optical sensor, and as illustrated in FIG. 1, it has a plate-like mounting portion 101a and a detecting portion 101b which is inserted into the oil pan 4. The oil pan bottom 4a is provided with a mounting hole (not illustrated) for mounting the oil level sensor 101. A detection portion 101b of the oil level sensor 101 is inserted into the oil pan 4 through the mounting hole. The mounting portion 101a is fixed to the oil pan bottom 4a of the oil pan 4 using a plurality of bolts 35 (three bolts in this embodiment, see FIG. 2) with the detection portion 101b being inserted into the mounting hole. An ultrasonic sensor may be used as the oil level sensor 101.

As illustrated in FIGS. 1 and 2, the harness 40 extends from the oil level sensor 101 to output an electric signal relating to a detection result of the oil level sensor 101 to a control unit 100. As illustrated in FIGS. 1 and 2, the harness 40 extends from the oil pan bottom 4a along the surface, of the engine 1, toward the rear of the vehicle, and is connected to a control unit 100 provided above the engine 1.

Here, a mounting structure of the harness 40 with respect to the engine 1 will be described with reference to FIGS. 1 to 6.

First, as illustrated in FIG. 2, the harness 40 extends diagonally from the oil level sensor 101 along the oil pan bottom 4a so as to be away from the transmission 10 and toward the rear of the vehicle when viewed from below. Then, it is bent upward at a corner between the oil pan bottom 4a and the surface, of the oil pan 4, toward the rear of the vehicle (hereinafter, referred to as an oil pan rear surface 4b) so as to be along the corner, and extends upward along the oil pan rear surface 4b, as illustrated in FIG. 1. Next, the harness 40 extends upward along the oil pan rear surface 4b, and then extends upward along the block rear surface 3a. Then, the harness 40 is bent so as to be away from the transmission 10 within a predetermined height range in which the drive shaft 20 is included, in particular, within a height range in which the harness 40 overlaps with the drive shaft 20, when viewed from the rear of the vehicle, and extends in the vehicle width direction so as to be away from the transmission 10 along the block rear surface 3a. Then, the harness 40 is bent upward in the vicinity of an end, of the block rear surface 3a, away from the transmission 10, and extends upward. Thereafter, the harness 40 is collected together with another harness 140 extending from another sensor or the like, and they extend to a control unit 100 provided above the engine 1.

The harness 40 is attached to the engine 1 via a plurality of harness clips 60, so as to extend as described above. In the following description, in the harness 40, the portion behind a point in which the harness 40 is bent upward at the corner between the oil pan bottom 4a and the oil pan rear surface 4b so as to be along the corner and extends upward and before a point in which the harness 40 is bent on the block rear surface 3a so as to be away from the transmission 10 is referred to as an upwardly extending portion 42. Also, in the harness 40, the portion behind the point in which the harness 40 is bent on the block rear surface 3a so as to be away from the transmission 10 and before a point in which the harness 40 is bent upward in the vicinity of the end, of the block rear surface 3a, away from the transmission 10 and extends upward is referred to as a laterally extending portion 41. In other words, the upwardly extending portion 42 is disposed so as to extend upwardly from a position below the laterally extending portion 41 along the surface, of the engine 1, toward the rear of the vehicle (i.e., the oil pan rear surface 4b and the block rear surface 3a).

As illustrated in FIG. 1, in the vehicle width direction, the upwardly extending portion 42 is disposed in a position closer to the transmission 10 than the ball joint 22 is. More specifically, as illustrated in FIG. 4, the upwardly extending portion 42 is disposed so as to be entirely included in the range of the first support 25 in the vehicle width direction. As illustrated in FIG. 3, a space 25a is formed between the first support 25 and the block rear surface 3a, and a portion, of the upwardly extending portion 42, extending along the block rear surface 3a passes through the space 25a. As illustrated in FIG. 4, in the space 25a, the harness 40 is bent so as to be away from the transmission 10 within a predetermined height range in which the drive shaft 20 overlaps with the first shaft 21 when viewed from the rear of the vehicle, specifically, at a position near the upper end of the first shaft 21, thereby forming the laterally extending portion 41. The space 25a has a size and shape enough to allow for passage of a portion, of the upwardly extending portion 42, extending along the block rear surface 3a, a part of a bent portion between the upwardly extending portion 42 and the laterally extending portion 41, and a part of the laterally extending portion 41.

In this embodiment, when viewed from the rear of the vehicle, the laterally extending portion 41 is disposed so as to entirely overlap with the drive shaft 20. Specifically, as illustrated in FIG. 4, the laterally extending portion 41 is disposed such that the portion, of the laterally extending portion 41, which passes through the space 25a overlaps with the first shaft 21 when viewed from the rear of the vehicle, and a portion, of the laterally extending portion 41, extending beyond the space 25a overlaps with the ball joint 22 when viewed from the rear of the vehicle. The laterally extending portion 41 does not necessarily have to entirely overlap with the drive shaft 20 when viewed from the rear of the vehicle. For example, the upper end of the laterally extending portion 41 does not have to overlap with the drive shaft 20 in the connection portion between the first shaft 21 and the ball joint 22 when viewed from the rear of the vehicle.

Figure 5:
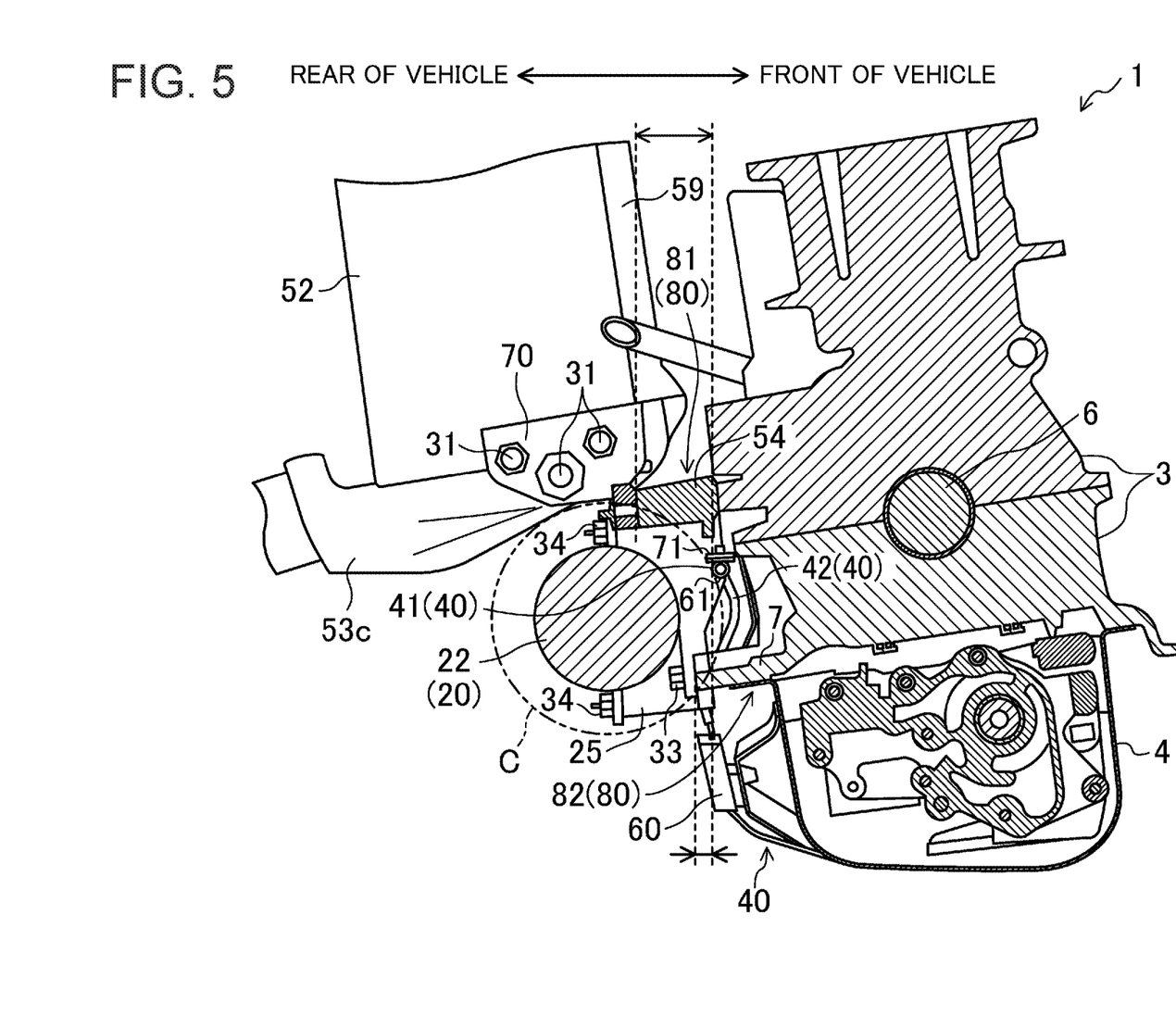
FIG. 5 is an enlarged view of the drive shaft support and its surroundings in a cross section taken along line V-V of FIG. 1.

Further, as illustrated in FIG. 5, the laterally extending portion 41 is arranged so as to be spaced apart from the drive shaft 20 in a vehicle longitudinal direction. As a result, as described above, even if the laterally extending portion 41 is disposed within the height range in which the laterally extending portion 41 overlaps with the drive shaft 20 when viewed from the rear of the vehicle, the laterally extending portion 41 and the drive shaft 20 do not interfere with each other, so that the harness 40 is not damaged by the drive shaft 20 itself.

However, when the vehicle travels on a snowy road, snow enters the engine compartment from the left and right wheels, and snow or the like may adhere to the drive shaft 20. During parking of the vehicle, the ice or the like may be formed on the outer peripheral surface of the drive shaft 20 due to the snow or the like. Particularly, if the vehicle is started from a parked state in a situation where icicle-shaped ice is formed on the outer peripheral surface of the drive shaft 20, the ice may be rotated around an axis of the drive shaft 20 integrally with the drive shaft 20, so that the ice comes into contact with the harness 40, and thus, the harness 40 may be damaged by the ice.

The upwardly extending portion 42 of the harness 40 is arranged so that the upwardly extending portion 42 in the vehicle width direction is entirely included in the range of the vehicle width direction of the drive shaft support 24 (strictly speaking, the first support 25). Snow or the like is less likely to adhere to the portion, of the drive shaft 20, which is covered with the drive shaft support 24, and ice is unlikely to be formed on the outer peripheral surface of the portion, so that the upwardly extending portion 42 is less likely to be damaged by the ice. Further, a portion, of the upwardly extending portion 42, adjacent to the drive shaft 20 is disposed closer to the transmission 10 than the ball joint 22 is, such that the portion overlaps with the first shaft 21 when viewed from the rear of the vehicle. The diameter of the first shaft 21 is smaller than that of the ball joint 22, so that a distance between the upwardly extending portion 42 and the drive shaft 20 is sufficiently provided. Therefore, the ice is less likely to come into contact with the upwardly extending portion 42.

On the other hand, when viewed from the rear of the vehicle, the laterally extending portion 41 is disposed so as to overlap with the ball joint 22 of the drive shaft 20. The diameter of the ball joint 22 is larger than that of the first shaft 21, such that the outer peripheral surface of the ball joint 22 is closer to the laterally extending portion 41 than the outer peripheral surface of the first shaft 21 is. Therefore, when icicle-shaped ice is formed on the outer peripheral surface of the ball joint 22, the ice is rotated around the axis of the drive shaft 20 integrally with the drive shaft 20 (the ball joint 22), and comes into contact with the laterally extending portion 41, so that the laterally extending portion 41 of the harness 40 is likely to be damaged by the ice.

Therefore, in this embodiment, the engine 1 is provided with projections 80 disposed above and below the laterally extending portion 41 within the predetermined height range in which the drive shaft 20 is included and projecting, toward the rear of the vehicle, further than the laterally extending portion 41.

Specifically, as the projections 80, an upper projection 81 is provided above the laterally extending portion 41, and a lower projection 82 is provided below the laterally extending portion 41. More specifically, the upper projection 81 is positioned at the height between the upper end of the first support 25 and the upper end of the second support 26 (see FIGS. 3 and 4), whereas the lower projection 82 is positioned at the same height as the portion, of the lower end of the cylinder block 3, toward the rear of the vehicle.

As illustrated in FIG. 5, the upper projection 81 is comprised of the fixing member 54 which fixes the case 53 of the direct catalyst 52 to the engine 1, and a part of the bracket 70 which is fixed to the fixing member 54. That is to say, the fixing member 54 is formed so as to project from the block rear surface 3a of the engine 1 toward the rear of the vehicle (strictly, to project slightly downward toward the rear of the vehicle), and the bracket 70 is attached to an end, of the fixing member 54, toward the rear of the vehicle. Thus, the upper projection 81 is formed above the laterally extending portion 41 so as to project, from the block rear surface 3a toward the rear of the vehicle, further than the laterally extending portion 41.

On the other hand, as illustrated in FIG. 5, the lower projection 82 is the block-side mounting flange 7. In other words, the block-side mounting flange 7 is formed so as to project, toward the rear of the vehicle, further than the laterally extending portion 41, thereby forming the lower projection 82.

As described above, the upper and lower projections 81 and 82 are respectively formed above and below the laterally extending portion 41. Therefore, even if icicle-shaped ice is formed on the outer peripheral surface of the drive shaft 20, in particular, the ball joint 22 during the parking of the vehicle, the ice is broken by abutting against the upper projection 81 or the lower projection 82 when the ice is rotated integrally with the drive shaft 20 at the time of starting the vehicle. Thus, the ice is less likely to come into contact with the laterally extending portion 41 between the upper projection 81 and the lower projection 82, thereby making it possible to protect the laterally extending portion 41 of the harness 40. Further, since the upper and lower projections 81 and 82 are respectively formed above and the laterally extending portion 41 to protect the laterally extending portion 41 of the harness 40, it is not necessary to provide a protective member for protecting the laterally extending portion 41 of the harness 40 from the ice. This can also reduce the manufacturing cost of the engine 1. Furthermore, the projections 80 are provided above and below the laterally extending portion 41, so that the ice can be destroyed before the ice reaches the position of the laterally extending portion 41 in both cases of forward starting and backward starting of the vehicle. As a result, the vehicle can be started without damaging the laterally extending portion 41 of the harness 40 due to the ice.

The length of the upper projection 81 and the length of the lower projection 82 in the vehicle longitudinal direction are set to be so long as to reliably allow the icicle-shaped ice formed on the outer peripheral surface of the ball joint 22 to come into contact with the upper projection 81 or the lower projection 82 and to be destroyed. Specifically, in a situation where a circle C circumscribing a portion, of the laterally extending portion 41, toward the rear of the vehicle is drawn around an axial center of the drive shaft 20 as a center when the drive shaft 20 is viewed from an axial direction thereof, an end, of the upper projection 81, toward the rear of the vehicle, and an end, of the lower projection 82, toward the rear of the vehicle are set so as to be positioned inside the circle C. Also, a predetermined height range in which the upper and lower projections 81 and 82 are provided is set to a height range in which the end, of the upper projection 81, toward the rear of the vehicle, and the end, of the lower projection 82, toward the rear of the vehicle are positioned inside the circle C.

In this embodiment, the center portion of the laterally extending portion 41 in the vehicle width direction is fixed to the engine 1 by one of harness clips 60 (hereinafter referred to as "a specific harness clips 61") such that the entire laterally extending portion 41 is disposed in a portion, of the gap between the upper projection 81 and the lower projection 82, adjacent to the upper projection 81.

Figure 6:
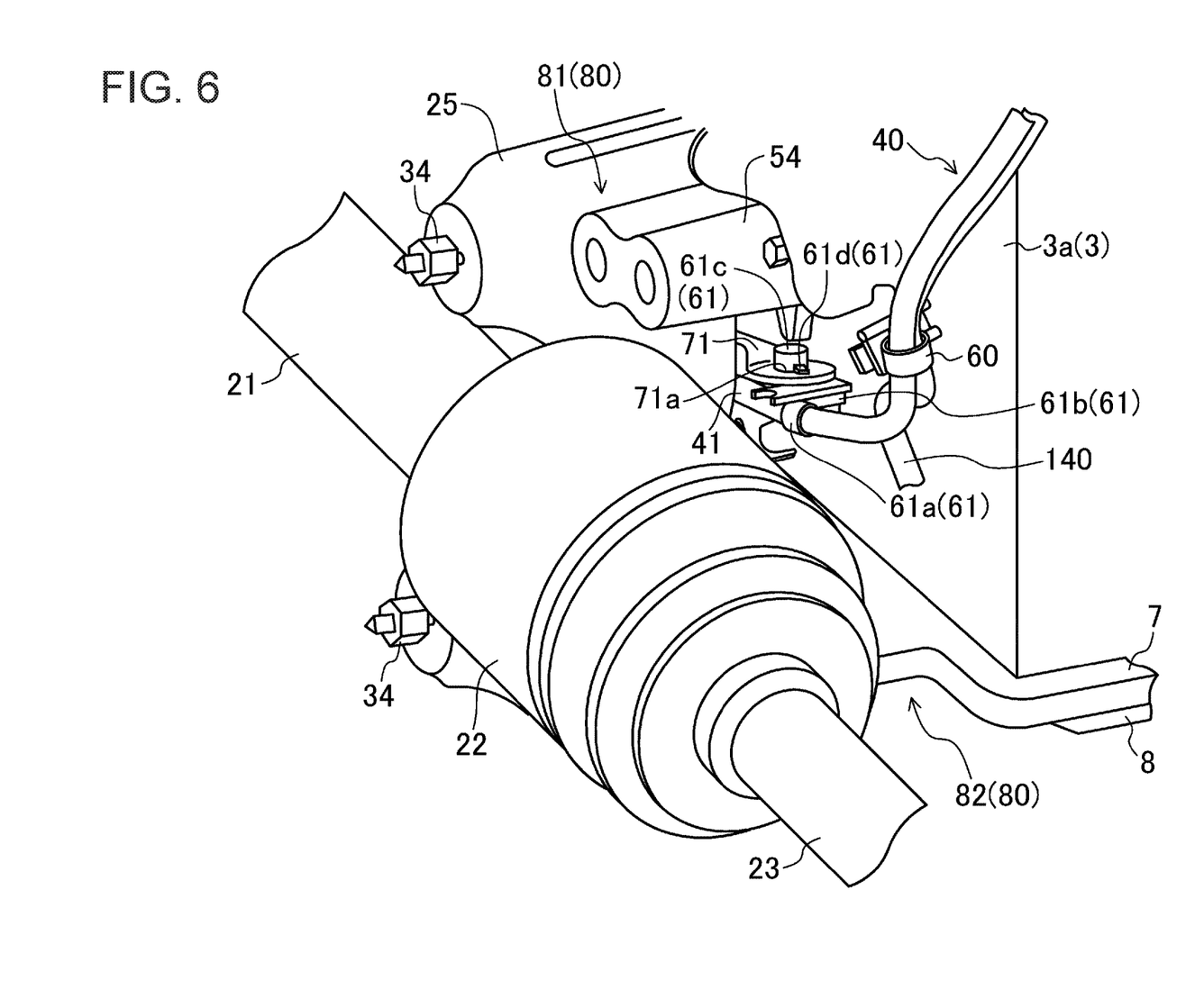
FIG. 6 is an enlarged perspective view of a specific harness clip and its surroundings.

Specifically, as illustrated in FIG. 6, a bracket 71 (attachment portion) is disposed on a portion, of the block rear surface 3a, adjacent to the upper projection 81 and between the upper projection 81 and the lower projection 82. The specific harness clip 61 is attached, and fixed, to the bracket 71. The specific harness clip 61 has a cover 61a covering the central portion of the outer peripheral surface of the laterally extending portion 41, and an attachment portion 61b to be attached to the bracket 71. The attachment portion 61b has an insertion portion 61c protruding upward and a claw portion 61d disposed at an intermediate portion of the insertion portion 61c in the vertical direction and extending from the insertion portion 61c in the vehicle width direction. The bracket 71 is provided with an insertion hole 71a into which the insertion portion 61c of the attachment portion 61b is inserted, and as illustrated in FIG. 6, the insertion portion 61c is inserted into the insertion hole 61a from the lower side toward the upper side, i.e., toward the upper projection 81. In a state in which the insertion portion 61c is inserted into the insertion hole 71a, the claw portion 61d is caught by the bracket 71, and the claw portion 61d is hooked on the bracket 71, so that the specific harness clip 61 is attached to the bracket 71 so as not to fall off from the bracket 71. As a result, the specific harness clip 61 is disposed in the portion, of the gap between the upper projection 81 and the lower projection 82, adjacent to the upper projection 81, and the whole of the laterally extending portion 41 is disposed in a portion, of the gap between the upper projection 81 and the lower projection 82, adjacent to the upper projection 81.

As described above, since the whole of the laterally extending portion 41 is disposed in the portion, of the gap between the upper projection 81 and the lower projection 82, adjacent to the upper projection 81, the distance between the outer peripheral surface of the ball joint 22 and the laterally extending portion 41 can be increased, compared with a case where the laterally extending portion 41 is disposed in the vertically center portion between the upper projection 81 and the lower projection 82. As a result, it is possible to more reliably prevent the icicle-shaped ice formed on the outer peripheral surface of the ball shaft 22 from coming into contact with the laterally extending portion 41. Further, even if icicle-shaped ice is formed in a portion of the outer peripheral surface of the drive shaft 20 within a height range between the specific harness clip 61 and the upper projection 81, the upper projection 81 prevents the ice from growing to the extent that the ice reaches the laterally extending portion 41, so that the ice does not damage the laterally extending portion 41.

The portion, of the laterally extending portion 41, which is provided with the specific harness clip 61 is covered by the cover 61a, and the specific harness clip 61 is attached to the bracket 71 by being inserted into the bracket 71 from below toward the upper projection 81. For example, in a situation where icicle-shaped ice is formed in a portion, of an outer peripheral surface of the ball joint 22, adjacent to the engine 1 and within a height range between the specific harness clip 61 and the lower projection 82, when the vehicle moves backward, the drive shaft 20 is rotated in a direction in which the ice approaches the specific harness clip 61. However, even if the ice is brought into contact with the specific harness clip 61, the laterally extending portion 41 (i.e., the harness 40) is protected by the specific harness clip 61. Further, since a load is applied to the specific harness clip 61 in a direction in which the specific harness 61 is to be inserted into the bracket 71 (upwardly in this embodiment), the specific harness clip 61 does not come off from the bracket 71. Further, when the drive shaft 20 is rotated in a direction away from the specific harness clip 61, the laterally extending portion 41 can be protected from the ice because the ice comes into contact with the lower projection 82 and is destroyed.

Further, in this embodiment, as illustrated in FIG. 5, the upper projection 81 is disposed below the lower end of the specific passage 59 of the exhaust passage 50 and above the laterally extending portion 41, i.e., between the lower end of the specific passage 59 and the laterally extending portion 41. In other words, since the harness 40 transmits an electric signal from the oil level sensor 101 (see FIGS. 1 and 2) to the control unit 100, it is desirable not only to protect the harness 40 from the ice formed on the outer surface of the drive shaft 20 but also to protect it from the radiant heat from the exhaust passage 50, in order to prevent noise from occurring in the electric signal. If the upper projection 81 is disposed between the lower end of the specific passage 59 and the laterally extending portion 41, the upper projection 81 functions as a heat insulating portion that blocks the radiant heat from the specific passage 59 toward the laterally extending portion 41. Thus, the laterally extending portion 41 of the harness 40 can be protected not only from the ice but also from the radiation heat from the exhaust passage 50. In addition, a portion, of the laterally extending portion 41, overlapping with the first shaft 21 when viewed from the rear of the vehicle and a part of the upwardly extending portion 42 are disposed in the space 25a formed in the first support 25, so that the first support 25 functions as a heat insulating portion that blocks the radiation heat from the specific passage 59. Thus, it is possible to more reliably protect the harness 40 from radiation heat from the exhaust passage 50.

According to this embodiment, the harness 40 extending from the oil level sensor 101 disposed in the oil pan bottom 4a has the laterally extending portion 41 disposed along the surface, of the engine 1, toward the rear of the vehicle, and extending in the axial direction of the drive shaft 20 within the predetermined height range in which the drive shaft 20 is included. Further, the engine 1 is provided with the upper projection 81 and the lower projection 82 which project, toward the rear of the vehicle, further than the laterally extending portion 41, and which are respectively disposed above and below the laterally extending portion 41. For this reason, in a situation where when the vehicle is moved forward or backward from the parking state and breaking the ice, even if ice, especially, icicle-shaped ice is formed on an outer peripheral surface of the drive shaft 20 during parking of the vehicle, the ice can be brought into contact with the upper projection 81 or the lower projection 82 to be broken so as not to come into contact with the harness 40, and then, the vehicle can be started. As a result, it is possible to protect the harness 40 from the ice formed on the outer peripheral surface of the drive shaft 20 without providing a protective member for protecting the harness 40 from the ice.

The present disclosure is not limited to the embodiment described above. Any change can be made within the scope of the claims as appropriate.

For example, in the above embodiment, the two projections, namely, the upper projection 81 and the lower projection 82, are provided as the projections 80. However, the present disclosure is not limited thereto, and only one of the upper projection 81 or the lower projection 82 may be provided. In this case, for example, in a situation where only the upper projection 81 is provided, if the vehicle is to be started forward, the vehicle may be moved forward as it is, and if the vehicle is to be started backward, the vehicle may be once moved forward and then, may be moved backward. Because of such operations, even if the icicle-shaped ice is formed on the outer peripheral surface of the drive shaft 20, the ice can be broken by the upper projection 81 so as not to come into contact with the harness 40, and then, the vehicle can be started. On the other hand, in a situation where only the lower projection 82 is provided, if the vehicle is to be started forward, the vehicle may be once retreated, and then, may be moved forward, and if the vehicle is to be started backward, the vehicle may be moved backward as it is. Because of such operations, the ice is broken by the lower projection 82 so as not to come into contact with the harness 40, and then, the vehicle can be started.

In addition, in the above embodiment, the bracket 71 is disposed in the portion, of the gap between the upper projection 81 and the lower projection 82, adjacent to the upper projection 81, and the harness clip 61 is inserted into the bracket 71 from below toward the upper projection 81. Alternatively, the bracket 71 may be disposed in the portion, of the gap between the upper projection 81 and the lower projection 82, adjacent to the lower projection 82, and the specific harness clip 61 may be inserted into the bracket 71 from above toward the lower projection 82.

Further, in the above embodiment, as illustrated in FIG. 5, the upper projection 81 is comprised of the fixing member 54 and a part of the bracket 70 fixed to the fixing member 54, and the lower projection 82 is comprised of the block-side mounting flange 7. Alternatively, for example, the upper projection 81 may be comprised of the first support 25 of the drive shaft support 24, or the lower projection 82 may be comprised of another member which is different from the elements of the engine 1.

The foregoing embodiments are merely preferred examples in nature, and the scope of the technique disclosed in this specification should not be interpreted in a limited manner. The scope of the present disclosure is defined by the appended claims, and all variations and modifications falling within the scope of the appended claims are intended to be within the scope of the present disclosure.

INDUSTRIAL APPLICABILITY

The technique disclosed in this specification is useful as a harness mounting structure including an engine mounted in an engine compartment of a vehicle, a drive shaft extending in a vehicle width direction such that the drive shaft is disposed in a portion, of the engine, toward the rear of the vehicle in the engine compartment and passes a position where the drive shaft overlaps with the engine when viewed from the rear of the vehicle, and a harness disposed along a surface, of the engine, toward the rear of the vehicle.

DESCRIPTION OF REFERENCE CHARACTERS

1 Engine
3a Block Rear Surface (Surface, of Engine, toward Rear of Vehicle)
4b Oil Pan Rear Surface (Surface, of Engine, toward Rear of Vehicle)
10 Transmission
20 Drive Shaft
21 First Shaft (First Portion)
22 Ball Joint (Second Portion)
24 Drive Shaft Support
25a Space
40 Harness
41 Laterally Extending Portion
42 Upwardly Extending Portion
50 Exhaust Passage
59 Specific Passage
61 Specific Harness Clip (Harness Clip for Fixing Laterally Extending Portion to Portion, of Engine, forward Rear of Vehicle)
61c Insertion Portion
71 Bracket (Attachment Portion)
71a Insertion Hole
80 Projection
81 Upper Projection
82 Lower Projection

The invention claimed is:

1. A harness mounting structure which is provided with an engine mounted in an engine compartment of a vehicle, a drive shaft extending in a vehicle width direction such that the drive shaft is disposed on a portion of the engine toward the rear of the vehicle in the engine compartment and passes a position where the drive shaft overlaps with the engine when viewed from the rear of the vehicle, and a harness disposed along at least a surface of the engine toward the rear of the vehicle, the harness mounting structure comprising:
   a laterally extending portion of the harness disposed along the surface of the engine toward the rear of the vehicle, and extending in the vehicle width direction within a predetermined height range in which the drive shaft is included; and
   a projection disposed in at least one of a position above the laterally extending portion or a position below the laterally extending portion within the predetermined height range in the portion of the engine toward the rear of the vehicle, the projection projecting toward the rear of the vehicle further than the laterally extending portion.

2. The harness mounting structure of claim 1, wherein when viewed from the rear of the vehicle, the laterally extending portion is disposed so as to substantially overlap with the drive shaft.

3. The harness mounting structure of claim 1, wherein the engine is a transverse engine,
a transmission is disposed adjacent to one end of the engine in the vehicle width direction,
in the vehicle width direction, the drive shaft has a first portion and a second portion in the vehicle width direction in this order from the transmission toward the engine, the second portion having a larger diameter than the first portion,
in the vehicle width direction, the harness has an upwardly extending portion disposed closer to the transmission than the laterally extending portion, and extending upwardly from a position below the laterally extending portion along the surface of the engine toward the rear of the vehicle, and
in the vehicle width direction, the upwardly extending portion is disposed closer to the transmission than the second portion is.

4. The harness mounting structure of claim 3, wherein a drive shaft support rotatably supporting the drive shaft is disposed in a portion of the first portion adjacent to a connection portion between the first portion and the second portion,
the drive shaft support is mounted on the surface of the engine toward the rear of the vehicle, and
a space through which the upwardly extending portion passes is formed between the drive shaft support and the surface of the engine toward the rear of the vehicle.

5. The harness mounting structure of claim 1, wherein the projection includes an upper projection provided above the laterally extending portion and a lower projection provided below the laterally extending portion within the predetermined height range,
a harness clip is provided between the upper projection and the lower projection, and fixes the laterally extending portion to the portion of the engine toward the rear of the vehicle, and
the harness clip is disposed in a portion of a gap between the upper projection and the lower projection, adjacent to one of the upper projection or the lower projection.

6. The harness mounting structure of claim 5, wherein an attachment portion is provided adjacent to the upper projection or the lower projection in the portion of the engine toward the rear of the vehicle, and fixes the harness clip to the portion, of the engine, toward the rear of the vehicle,
the harness clip has an insertion portion inserted into an insertion hole formed in the attachment portion, and
the insertion portion is inserted into the insertion hole toward the projection closer to the attachment portion.

7. The harness mounting structure of claim 1, wherein the engine includes an exhaust passage having a specific passage extending along the surface of the engine toward the rear of the vehicle,
a lower end of the specific passage of the exhaust passage is positioned above the laterally extending portion, and
the projection is provided in at least a position below the lower end of the specific passage of the exhaust passage and above the laterally extending portion.

8. The harness mounting structure of claim 1, wherein a length of the projection in a vehicle longitudinal direction is set such that, in a situation where a circle circumscribing a portion of the laterally extending portion of the harness, toward the rear of the vehicle is drawn around an axial center of the drive shaft as a center when viewed from an axial direction of the drive shaft, an end of the projection toward the rear of the vehicle is positioned inside the circle.

* * * * *